United States Patent
Abell et al.

(10) Patent No.: US 8,196,804 B2
(45) Date of Patent: Jun. 12, 2012

(54) METHOD FOR SOLDERING COMPONENTS

(75) Inventors: Bradley David Abell, Stuttgart (DE); Klaus Dieter Förster, Ludwigsburg (DE); Bernd Grünenwald, Nürtingen (DE); Andreas Jenseit, Korntal-Münchingen (DE); Cord Völker, Backnang (DE)

(73) Assignee: Behr GmbH & Co. KG, Stuttgart (DE)

( * ) Notice: Subject to any disclaimer, the term of this patent is extended or adjusted under 35 U.S.C. 154(b) by 627 days.

(21) Appl. No.: 12/278,901

(22) PCT Filed: Feb. 13, 2007

(86) PCT No.: PCT/EP2007/001242
§ 371 (c)(1),
(2), (4) Date: Sep. 10, 2008

(87) PCT Pub. No.: WO2007/093388
PCT Pub. Date: Aug. 23, 2007

(65) Prior Publication Data
US 2009/0026248 A1    Jan. 29, 2009

(30) Foreign Application Priority Data
Feb. 13, 2006   (DE) .................. 10 2006 006 768

(51) Int. Cl.
*B23K 1/20* (2006.01)
(52) U.S. Cl. ............. 228/262.5; 228/262.51; 228/262.9; 266/108
(58) Field of Classification Search ............... 228/262.5, 228/262.51, 262.9; 266/108
See application file for complete search history.

(56) References Cited

U.S. PATENT DOCUMENTS

| | | | | |
|---|---|---|---|---|
| 3,882,596 A * | 5/1975 | Kendziora et al. | ............. | 228/200 |
| 3,982,887 A | 9/1976 | Kendziora et al. | | |
| 4,231,508 A | 11/1980 | Wagner | | |
| 4,886,449 A * | 12/1989 | Brittin | ............. | 432/121 |
| 5,195,673 A | 3/1993 | Irish et al. | | |
| 5,839,646 A | 11/1998 | Duda et al. | | |
| 6,129,258 A * | 10/2000 | Boswell et al. | ............. | 228/102 |
| 6,382,964 B2 * | 5/2002 | Sakamoto et al. | ............. | 432/171 |
| 2004/0185293 A1 * | 9/2004 | Syslak et al. | ............. | 428/654 |

FOREIGN PATENT DOCUMENTS

| | | |
|---|---|---|
| DE | 2 254 769 | 5/1974 |
| DE | 10 2004 054 923 A1 | 11/2005 |
| EP | 0 778 453 A1 | 6/1997 |
| EP | 0 781 623 A1 | 7/1997 |

OTHER PUBLICATIONS

Random House Dictionary, www.dictionary.com "Flushing".*

* cited by examiner

*Primary Examiner* — Jessica L Ward
*Assistant Examiner* — Erin Saad
(74) *Attorney, Agent, or Firm* — Muncy, Geissler, Olds & Lowe, PLLC

(57) ABSTRACT

The invention relates to a method for soldering components, in particular heat exchanger, in particular made of aluminum materials, aluminum alloys or wrought alloys, in a soldering furnace, in particular a continuous soldering furnace or a batch-type soldering furnace, which comprises a muffle, which is flushed with protective gas in order to create a protective atmosphere. In order to make the production of soldered components easier, during the soldering of the components the muffle is supplied with such a greatly increased amount of gas, in particular protective gas or reaction gas, that a low-oxygen protective atmosphere is created.

33 Claims, 1 Drawing Sheet

| | BM CF | | | BM tube | | | SP TM | | |
|---|---|---|---|---|---|---|---|---|---|
| | min | preferred | max | min | preferred | max | min | preferred | max |
| Al | rest | rest | rest | rest | rest | rest | rest | rest | rest |
| Si | 0 | 0.20 - 0.60 | 1.2 | 0 | - | 1.2 | 6 | 7 - 11 | 20 |
| Fe | 0 | 0 - 0.40 | 0.7 | 0 | 0 - 0.30 | 0.7 | 0 | 0 - 0.20 | 0.8 |
| Cu | 0 | - | 0.3 | 0.10 | 0.30 - 0.80 | 1.2 | 0 | 0 - 0.30 | 1.0 |
| Mn | 0 | - | 2.0 | 0 | - | 2.0 | 0 | - | 0.15 |
| Mg | 0 | 0 - 0,50 | 2.0 | 0 | 0.10 - 0.30 | 2.0 | 0 | 0 - 0.20 | 2.5 |
| Cr | 0 | 0 - 0,20 | 0.5 | 0 | 0 -0.20 | 0.5 | 0 | - | 0.05 |
| Zn | 0 | - | 4.5 | 0 | - | 5.0 | 0 | 0 - 2.0 | 4.5 |
| Ti | 0 | - | 0.2 | 0 | 0 - 0.20 | 0.3 | 0 | 0 - 0.10 | 0.2 |
| Sn | 0 | - | 0.2 | 0 | - | 0.05 | 0 | - | 0.05 |
| Zr | 0 | - | 0.2 | 0 | - | 0.2 | 0 | - | 0.05 |
| Bi | 0 | - | 0.05 | 0 | - | 0.05 | 0 | 0 - 0.10 | 0.3 |
| Sr | 0 | - | 0.05 | 0 | - | 0.05 | 0 | 0 - 0.05 | 0.2 |

|     | BM CF |     |     | BM tube |     |     | SP TM |     |     |
| --- | --- | --- | --- | --- | --- | --- | --- | --- | --- |
|     | min | preferred | max | min | preferred | max | min | preferred | max |
| Al | rest | rest | rest | rest | rest | rest | rest | rest | rest |
| Si | 0 | 0.20 - 0.60 | 1.2 | 0 | - | 1.2 | 6 | 7 - 11 | 20 |
| Fe | 0 | 0 - 0.40 | 0.7 | 0 | 0 - 0.30 | 0.7 | 0 | 0 - 0.20 | 0.8 |
| Cu | 0 | - | 0.3 | 0.10 | 0.30 - 0.80 | 1.2 | 0 | 0 - 0.30 | 1.0 |
| Mn | 0 | - | 2.0 | 0 | - | 2.0 | 0 | - | 0.15 |
| Mg | 0 | 0 - 0,50 | 2.0 | 0 | 0.10 - 0.30 | 2.0 | 0 | 0 - 0.20 | 2.5 |
| Cr | 0 | 0 - 0,20 | 0.5 | 0 | 0 - 0.20 | 0.5 | 0 | - | 0.05 |
| Zn | 0 | - | 4.5 | 0 | - | 5.0 | 0 | 0 - 2.0 | 4.5 |
| Ti | 0 | - | 0.2 | 0 | 0 - 0.20 | 0.3 | 0 | 0 - 0.10 | 0.2 |
| Sn | 0 | - | 0.2 | 0 | - | 0.05 | 0 | - | 0.05 |
| Zr | 0 | - | 0.2 | 0 | - | 0.2 | 0 | - | 0.05 |
| Bi | 0 | - | 0.05 | 0 | - | 0.05 | 0 | 0 - 0.10 | 0.3 |
| Sr | 0 | - | 0.05 | 0 | - | 0.05 | 0 | 0 - 0.05 | 0.2 |

Fig. 1

METHOD FOR SOLDERING COMPONENTS

The invention relates to a process for brazing components, in particular heat exchangers, in particular made from aluminum materials, aluminum alloys or wrought alloys, in a brazing furnace, in particular a continuous brazing furnace or a batch-type brazing furnace, which comprises a muffle that is flushed with shielding gas in order to create a shielding gas atmosphere.

The brazing of aluminum heat exchangers is carried out using flux in what are known as shielding gas continuous furnaces. In the region of the furnace muffle, the furnace atmosphere between an entry opening and an exit opening has an oxygen content of approx. 500 ppm in the entry region and approx. 40 ppm in what is referred to as the brazing region. With this type of oxygen content in the furnace atmosphere, flux-free brazing is difficult if not impossible. Fluxes are nonmetallic substances which melt before the melting temperature of the solder is reached and wet the surface that is to be brazed. In this way, an oxide layer that forms on the surface of aluminum and the oxygen atmosphere is dissolved or made to float away. The flux at the same time prevents the surface from being reoxidized by residual oxygen present in the furnace atmosphere. Known brazing processes using flux include the Nocolok process and the CAB (Controlled Atmosphere Brazing) process. The application of the flux is complex and expensive. Furthermore, after brazing the components still include flux, which involves a complex cleaning operation in particular if chloridic fluxes are used. Further drawbacks of brazing with flux include: costs of the flux, investment and operating costs of the fluxing device, waste disposal, dust and environmental pollution, drying/heating of the components after fluxing, energy costs, investment and operating costs of the dry furnace, space requirements, flux on the surface of the workpieces, flux residues in the circulation of media. European patent EP 0 781 623 B1 has disklosed a process for producing brazed aluminum heat exchangers in which specific heat exchangers are partly brazed without flux in CAB furnaces.

It is also possible for the aluminum heat exchangers to be brazed under a vacuum in single-chamber or multi-chamber vacuum furnaces. In this case, the oxide skin that is present is torn open as a result of the different thermal expansion of aluminum oxide and pure metal and the evaporation of magnesium out of solder and base material at high temperatures. Through evacuation of the receptacle, oxygen is kept away from the parts that are to be brazed. This low oxygen concentration in the furnace system prevents the exposed surface of the base materials and the surface of the molten solder from being covered with a fresh skin of oxide during brazing. However, brazing under a vacuum requires technically complex and therefore relatively expensive brazing facilities. Furthermore, the parts that are to be brazed must be absolutely clean, which can only be ensured by an expensive pretreatment. Further drawbacks of vacuum brazing are the high outlay on servicing and maintenance and the high demands imposed on surface quality and dimensional accuracy of the components.

It is an object of the invention to provide a process which simplifies the production of brazed components, in particular of heat exchangers, in particular made of aluminum materials, aluminum alloys or wrought alloys, in a brazing furnace, in particular a continuous brazing furnace or a batch-type brazing furnace, which comprises a muffle that is flushed with shielding gas in order to create a shielding gas atmosphere.

In a process for the brazing of components, in particular of heat exchangers, in particular made from aluminum materials, aluminum alloys or wrought alloys, in a brazing furnace, in particular a continuous brazing furnace or a batch-type brazing furnace which comprises a muffle that is flushed with shielding gas in order to create a shielding gas atmosphere, the object is achieved by the fact that during brazing of the components the brazing furnace muffle is supplied with such a greatly excess quantity of gas, in particular shielding gas or reaction gas, that a low-oxygen shielding gas atmosphere is created. Supplying the greatly excess quantity of shielding gas improves the shielding gas atmosphere in such a way that the components can be brazed without the addition of fluxes. The process according to the invention is preferably used in what are known as shielding gas continuous furnaces. In the context of the invention, it is possible, although not necessary, to completely do without the use of fluxes. It is possible to partially add flux onto or at the component without any adverse effect on regions of the component which are brazed without the use of flux.

When using vacuum brazing, the high vacuum required for the vacuum furnace systems involves a very high level of technical outlay. Therefore, vacuum furnace systems are very expensive to purchase and complex to operate. High demands are also imposed on the purity of the surface of the components that are to be brazed with regard to contaminating substances (dirt, dust, chips, oxide layers, residues and traces of manufacturing auxiliaries).

The drawbacks of using fluxes to braze aluminum vary according to the flux system used. In general, the application of the flux constitutes an additional step in the manufacturing chain, involving outlay on equipment and operating staff. Corresponding safety and environmental outlay is involved in protecting the workers and environment from flux liquid, flux mist, flux dust or flux vapor. Immediately after the brazing operation, corrosive fluxes, such as for example chloridic fluxes, have to be removed from the heat exchanger again, at great expense and with great care, since otherwise they attack the material and connection points of the manufactured heat exchanger on account of their corrosive action, thereby impairing the technical functioning of the heat exchanger.

Special noncorrosive fluxes, such as the Nocolok flux, require a shielding gas atmosphere with a very low residual oxygen concentration, preferably of less than 200 ppm oxygen, to function. This is only possible in an atmosphere that is difficult to produce and is constantly monitored and readjusted within a closed furnace system flooded with the shielding gas in nitrogen. A brazing furnace of this type is known as a CAB (Controlled Atmosphere Brazing) system.

The temperature range in which the flux is active must cover the working range of the solder that is used. If the solder and flux are not carefully matched, brazing is not possible. The duration of activity of fluxes is limited, and consequently the brazing operation must be concluded within a narrow time window. When using fluxes, even small magnesium contents in the alloys of the components lead to a deterioration in solderability. This is attributable firstly to the oxidation rate of materials with added magnesium being three times higher compared to magnesium-free materials and secondly to the fact that the simple and complex oxides of magnesium that are formed, such as magnesium oxide (MgO) and magnesium aluminum oxide ($MgAl_2O_4$) have only a low solubility in flux. Furthermore, these magnesium oxides react with the flux and, for example in the case of Nocolok, form magnesium fluorides, which further greatly restrict the action of the flux.

However, the need to avoid the magnesium alloy which is imposed as a result leads to significant drawbacks in the properties of the aluminum alloys that are used in terms of strength and corrosion resistance.

When brazing heat exchangers, the invention makes use of the advantages of current prior art techniques, flux brazing and vacuum brazing, without being subject to their drawbacks, in combination with the use of special materials. At the same time, the brazing process according to the invention eliminates all fluxes and the associated drawbacks, such as additional work, additional manufacturing equipment or cleaning and protection measures.

Furthermore, the use of magnesium-containing corrugated fin alloys no longer constitutes a problem for the manufacture of heat exchangers, as was the case when flux systems were used. As a result, it becomes possible to use aluminum alloys with magnesium contents of greater than 0.2% and less than 2.0%, preferably less than 1.0%, for the flux-free brazing of heat exchangers in CAB furnaces. This leads to significant improvements in the strength properties and corrosion resistance of the aluminum materials used. Furthermore, by limiting specific elements in the base material and in the solder, it is possible to achieve a targeted improvement in the wetting properties of the base material and/or the solder. The elements which prove particularly critical in this respect include copper (Cu), Iron (Fe), Magnesium (Mg), Chromium (Cr), Titanium (Ti) and Strontium (Sr). Although a solder compound that may be sufficient under certain circumstances can be achieved by using a controlled brazing process even without deploying the preferred ranges listed below, it is not economically appropriate to do so, since both the furnace atmosphere is supposed to have oxygen contents of less than 20 ppm and the brazing time has to be lengthened.

For the brazing process according to the invention, it is preferable to use a CAB furnace system (continuous furnace or batch furnace), in which brazing can be carried out without flux and without the use of a complex vacuum furnace system.

A preferred exemplary embodiment of the process is characterized in that the gas comprises at least one noble gas from the eighth main group of the periodic system of the elements, hydrogen, nitrogen, carbon dioxide, carbon monoxide, ammonia and/or cracking gas products of natural gas.

Another preferred exemplary embodiment of the process is characterized in that during brazing of the components the muffle is supplied with such a greatly excess quantity of gas that the oxygen content of the shielding gas atmosphere, in particular in an entry region of the brazing furnace, is well below 500 ppm (parts per million). The use of the higher quantity of gas, in particular nitrogen, prevents or at least greatly reduces the penetration or entrainment of air or its constituents into the brazing furnace.

Another preferred exemplary embodiment of the process is characterized in that during brazing of the components the muffle is supplied with such a greatly excess quantity of gas that the oxygen content of the shielding gas atmosphere, in particular in a brazing region of the brazing furnace, is less than 50 ppm (parts per million), in particular significantly less than 40 ppm (parts per million). It is particularly preferable for the shielding gas atmosphere or brazing furnace atmosphere to contain less than 30 ppm (parts per million) of oxygen. The use of the higher quantity of gas significantly reduces the quantity of oxide-forming substances, such as oxygen, in the shielding gas atmosphere.

Another preferred exemplary embodiment of the process is characterized in that during the brazing the shielding gas atmosphere is heated to above room temperature. An oxide layer that may be present is torn open during this heating. As a result of the oxide-free gaps, cracks or surfaces which are then formed, it is possible, for example, for magnesium from a core material and/or a solder plating of the components to reach the surface. The magnesium acts as a wetting promoter at the surface.

Another preferred exemplary embodiment of the process is characterized in that the object temperature in the brazing furnace is above 300 degrees Celsius. At this object temperature, the moisture content in the brazing furnace atmosphere needs to be taken into consideration.

Another preferred exemplary embodiment of the process is characterized in that the dew point in the brazing furnace atmosphere is below minus 45 degrees Celsius. This value has proven particularly advantageous in the context of the present invention.

Another preferred exemplary embodiment of the process is characterized in that during the heat-up phase in the brazing furnace a minimum time of not less than three minutes is used in a temperature range from 400 to 615 degrees Celsius. For the temperature range from 400 to 615 degrees Celsius, it is particularly preferable to set times of from four to eight minutes. The time/temperature profile according to the invention in the brazing furnace improves or permits solder wetting.

Another preferred exemplary embodiment of the process is characterized in that a characteristic value SQ, which corresponds to the quotient formed by dividing the quantity of gas, in particular the quantity of shielding gas, by the cross section of the brazing furnace, is set to be greater than 250 meters per hour. It is particularly preferable to set values of between 500 and 750 meters per hour for the characteristic value SQ. It is possible but not imperative to set a higher characteristic value.

Another preferred exemplary embodiment of the process is characterized in that a characteristic value SO, which corresponds to the quotient formed by dividing the quantity of gas, in particular the quantity of shielding gas, by the heated volume of the brazing furnace, is set to be greater than 25 per hour. It is particularly preferable to set values of between 45 and 70 per hour for the characteristic value SO. It is possible but not imperative to set a higher characteristic value.

Another preferred exemplary embodiment of the process is characterized in that a characteristic value SB, which corresponds to the quotient formed by dividing the quantity of gas, in particular the quantity of shielding gas, by the size of the component surface area, is set to be less than 6 meters per hour. It is particularly preferable to set values of less than 1.5 meter per hour for the characteristic value SB.

Another preferred exemplary embodiment of the process is characterized in that a characteristic value SM, which corresponds to the quotient formed by dividing the quantity of gas, in particular the quantity of shielding gas, by the size of the heated muffle inner surface area of the brazing furnace, is set to be greater than 3 meters per hour. It is particularly preferable to set values of between 6 and 9 meters per hour for the characteristic value SM. It is possible but not imperative to set a higher characteristic value.

Another preferred exemplary embodiment of the process is characterized in that a characteristic value MB, which corresponds to the quotient formed by dividing the size of the heated muffle inner surface area by the size of the component surface area, is set to be less than 0.7. It is particularly preferable to use values of less than 0.3 for the characteristic value MB.

Another preferred exemplary embodiment of the process relates to the brazing of heat exchangers having guide devices, in particular corrugated fins, made from an aluminum base material. Particularly preferably, tubes and/or disks of the heat exchangers likewise consist of exactly one or more aluminum base materials, in particular the aluminum base material of the guide devices.

Another preferred exemplary embodiment of the process is characterized in that the aluminum base material of the guide devices contains up to 1.2 percent silicon.

It is particularly preferable for the aluminum base material of the guide devices to contain 0.2 to 0.6 percent silicon.

Another preferred exemplary embodiment of the process is characterized in that the aluminum base material of the guide devices contains up to 0.7 percent iron. It is particularly preferable for the aluminum base material of the guide devices to contain up to 0.4 percent iron.

Another preferred exemplary embodiment of the process is characterized in that the aluminum base material of the guide devices contains up to 0.3 percent copper.

Another preferred exemplary embodiment of the process is characterized in that the aluminum base material of the guide devices contains up to 2.0 percent, preferably up to 1.0 percent manganese.

Another preferred exemplary embodiment of the process is characterized in that the aluminum base material of the guide devices contains up to 1.0 percent magnesium.

It is particularly preferable for the aluminum base material of the guide devices to contain up to 0.5 percent magnesium.

Another preferred exemplary embodiment of the process is characterized in that the aluminum base material of the guide devices contains up to 0.5 percent chromium.

It is particularly preferable for the aluminum base material of the guide devices to contain up to 0.2 percent chromium.

Another preferred exemplary embodiment of the process is characterized in that the aluminum base material of the guide devices contains up to 4.5 percent, preferably up to 2.5 percent zinc.

Another preferred exemplary embodiment of the process is characterized in that the aluminum base material of the guide devices contains up to 0.2 percent titanium.

Another preferred exemplary embodiment of the process is characterized in that the aluminum base material of the guide devices contains up to 0.2 percent tin.

Another preferred exemplary embodiment of the process is characterized in that the aluminum base material of the guide devices contains up to 0.2 percent zirconium.

Another preferred exemplary embodiment of the process is characterized in that the aluminum base material of the guide devices contains up to 0.05 percent bismuth.

Another preferred exemplary embodiment of the process is characterized in that the aluminum base material of the guide devices contains up to 0.05 percent strontium.

A preferred exemplary embodiment of the process relates to the brazing of heat exchangers having tubes and/or disks made from an aluminum base material.

Another preferred exemplary embodiment of the process is characterized in that the aluminum base material of the tubes and/or disks contains up to 1.2 percent silicon.

Another preferred exemplary embodiment of the process is characterized in that the aluminum base material of the tubes and/or disks contains up to 0.7 percent iron. It is particularly preferable for the aluminum base material of the tubes and/or disks to contain up to 0.3 percent iron.

Another preferred exemplary embodiment of the process is characterized in that the aluminum base material of the tubes and/or disks contains 0.1 to 1.2 percent copper. It is particularly preferable for the aluminum base material of the tubes and/or disks to contain 0.3 to 0.8 percent copper.

Another preferred exemplary embodiment of the process is characterized in that the aluminum base material of the tubes and/or disks contains up to 2.0 percent manganese.

Another preferred exemplary embodiment of the process is characterized in that the aluminum base material of the tubes and/or disks contains up to 2.0 percent, preferably up to 1.0 percent magnesium. It is particularly preferable for the aluminum base material of the tubes and/or disks to contain 0.1 to 0.3 percent magnesium.

Another preferred exemplary embodiment of the process is characterized in that the aluminum base material of the tubes and/or disks contains up to 0.5 percent chromium. It is particularly preferable for the aluminum base material of the tubes and/or disks to contain up to 0.2 percent chromium.

Another preferred exemplary embodiment of the process is characterized in that the aluminum base material of the tubes and/or disks contains up to 5.0 percent zinc.

Another preferred exemplary embodiment of the process is characterized in that the aluminum base material of the tubes and/or disks contains up to 0.3 percent titanium. It is particularly preferable for the aluminum base material of the tubes and/or disks to contain up to 0.1 percent titanium.

Another preferred exemplary embodiment of the process is characterized in that the aluminum base material of the tubes and/or disks contains up to 0.05 percent tin.

Another preferred exemplary embodiment of the process is characterized in that the aluminum base material of the tubes and/or disks contains up to 0.2 percent zirconium.

Another preferred exemplary embodiment of the process is characterized in that the aluminum base material of the tubes and/or disks contains up to 0.05 percent bismuth.

Another preferred exemplary embodiment of the process is characterized in that the aluminum base material of the tubes and/or disks contains up to 0.05 percent strontium.

Another preferred exemplary embodiment of the process relates to the brazing of heat exchangers having guide devices, in particular corrugated fins, and/or tubes and/or disks, which are provided with a solder plating. It is preferable for the solder plating to contain primarily aluminum.

Another preferred exemplary embodiment of the process is characterized in that the solder plating contains 6 to 20 percent silicon. It is particularly preferable for the solder plating to contain 7 to 11 percent silicon.

Another preferred exemplary embodiment of the process is characterized in that the solder plating contains up to 0.8 percent iron. It is particularly preferable for the solder plating to contain up to 0.2 percent iron.

Another preferred exemplary embodiment of the process is characterized in that the solder plating contains up to 1.0 percent copper. It is particularly preferable for the solder plating to contain up to 0.3 percent copper.

Another preferred exemplary embodiment of the process is characterized in that the solder plating contains up to 0.15 percent manganese.

Another preferred exemplary embodiment of the process is characterized in that the solder plating contains up to 2.5 percent magnesium. It is particularly preferable for the solder plating to contain up to 0.2 percent, preferably up to 0.1 percent magnesium.

Another preferred exemplary embodiment of the process is characterized in that the solder plating contains up to 0.05 percent chromium.

Another preferred exemplary embodiment of the process is characterized in that the solder plating contains up to 4.5 percent, preferably up to 4.0 percent zinc. It is particularly preferable for the solder plating to contain up to 2.0 percent zinc.

Another preferred exemplary embodiment of the process is characterized in that the solder plating contains up to 0.2 percent titanium. It is particularly preferable for the solder plating to contain up to 0.1 percent titanium.

Another preferred exemplary embodiment of the process is characterized in that the solder plating contains up to 0.05 percent tin.

Another preferred exemplary embodiment of the process is characterized in that the solder plating contains up to 0.05 percent zirconium.

Another preferred exemplary embodiment of the process is characterized in that the solder plating contains up to 0.3 percent bismuth. It is particularly preferable for the solder plating to contain up to 0.1 percent bismuth.

Another preferred exemplary embodiment of the process is characterized in that the solder plating contains up to 0.2 percent strontium. It is particularly preferable for the solder plating to contain up to 0.05 percent strontium.

The process according to the invention is preferably used for the brazing of heat exchangers having flow devices, in particular tubes and/or disks, and/or guide devices, in particular corrugated fins, each with or without solder plating, made from one or more aluminum base materials.

It is preferable for one of the aluminum base materials to contain 0.7 to 2 percent, preferably 1 to 1.5 percent manganese. This has a positive effect on the mechanical properties of the aluminum base material.

The invention is based on the diskovery, inter alia, that a higher iron content is detrimental to good wetting of the core material with solder material, since wetting-inhibiting iron/manganese precipitations can apparently be formed. Therefore, it is advantageous for the aluminum base material to contain less than 0.40 percent, preferably less than 0.25 percent, particularly preferably less than 0.20 percent iron. An iron content of over 0.20 percent can be compensated for by an increased brazing time, but above about 0.25 percent iron a temperature profile may have to be modified slightly over the duration of brazing in order to achieve a good brazing result.

A further preferred exemplary embodiment of the process is characterized in that the muffle is formed from a muffle material which comprises stainless steel. The muffle material preferably consists of stainless steel 316L or 316LL. However, it is also possible to use another stainless steel that is suitable for use as a muffle material. All typical variants, such as for example a pure radiation brazing furnace, a furnace with a convection preheating zone coupled to a downstream radiation zone or a furnace type based completely on convection technology are suitable with regard to the furnace design.

Another preferred exemplary embodiment of the process is characterized in that during a heat-up phase in the brazing furnace a minimum time of at least two minutes is used in a temperature range from minus 30 to minus 50 Kelvin before the solidus temperature of the solder is reached. For the temperature range from minus 30 to minus 50 Kelvin before the solidus temperature of the solder is reached, it is particularly preferable to set times of from two to five minutes. Times of greater than six minutes are also possible but not economically beneficial.

Further advantages, features and details of the invention will emerge from the following description, in which various exemplary embodiments are described in detail with reference to the drawing, in which:

FIG. 1 shows a table giving materials and solders that can preferably be used in the process according to the invention.

The invention relates to the brazing of aluminum heat exchangers in shielding gas continuous brazing furnaces. A shielding gas continuous brazing furnace comprises a housing having an entry and an exit for components. The housing entry for the components is also referred to as the entry zone of the brazing furnace. The housing exit for the components is also referred to as the exit zone of the brazing furnace. A muffle that is flushed with shielding gas is formed between the entry zone and exit zone, in the interior of the brazing furnace.

In conventional shielding gas continuous brazing furnaces, in operation a furnace atmosphere with an oxygen content of approximately 500 ppm (parts per million) in the entry zone and approximately 40 ppm in the brazing zone is used in the region of the furnace muffle between the entry opening and the exit opening. Flux-free brazing is not possible with oxygen contents of this level in the furnace atmosphere. According to one significant aspect of the present invention, the shielding gas atmosphere in the brazing furnace is improved, by a greatly increased addition of the shielding gas, preferably nitrogen, in such a way that heat exchangers can be brazed without the addition of fluxes.

The greatly excess quantity of nitrogen creates in the brazing furnace an atmosphere which is so low in oxygen that the brazing of the components can be carried out without flux. The use of the higher quantity of nitrogen prevents the penetration or entrainment of air or its constituents into the brazing furnace. In this way, the level of oxide-forming substances, in particular oxygen, in the brazing furnace can be significantly reduced.

In the process according to the invention, it is possible, although not necessary, to completely eliminate the use of fluxes. Doping of the incoming shielding gas with flux or reducing substances in solid, liquid or gaseous form can be selected as desired. The high level of use of shielding gas greatly reduces or virtually eliminates undesirable oxidation of the aluminum surface during the brazing process in the temperature range above room temperature. Any oxide layer that may be present is torn open during the heating. Magnesium which originates from the core material and/or a solder plating can reach the surface through the oxide-free gaps, cracks and/or surfaces that are formed. The magnesium at the surface acts as a wetting promoter. As an alternative to magnesium, it is also possible to use elements from main groups two and five of the periodic system of the elements, individually or in combination and in various mixtures and concentrations.

The process according to the invention gives the advantage, inter alia, that the flux costs can be saved. Furthermore, it is possible to eliminate the costs of procuring and operating a fluxing device. Furthermore, the waste disposal costs are reduced. Moreover, dust and environmental pollution are reduced. The heating of the components for drying after fluxing can also be eliminated. This considerably reduces the outlay on energy that is required.

For flux-free brazing, an oxygen level of less than 50 ppm is desirable above an object temperature of 300 degrees Celsius in the brazing furnace. Furthermore, the moisture content in the brazing furnace atmosphere needs to be taken into account. A dew point of less than minus 45 degrees Celsius is desirable in the brazing furnace atmosphere. Furthermore, the following characteristic values should be observed.

Shielding gas quantity [$M^3$/h(s.t.p.)]/furnace cross section [$m^2$]=characteristic value abbreviation SQ [m/h].

The characteristic value SQ should be set at >250 m/h. The value should normally be set between 500 m/h and 750 m/h. It is possible but not imperative to set a higher characteristic value.

In the context of the present invention, the designation M (s.t.p.) refers to meters (standard temperature and pressure). A meter (standard temperature and pressure) denotes 1.0 m at a standard temperature of 20 degrees Celsius and a standard pressure of 1 bar.

Shielding gas quantity [m$^3$ (s.t.p.)/h]/heated furnace volume [m$^3$]=characteristic value abbreviation SO [l/h]. The characteristic value SO should be set at >25 l/h. Values of between 45 l/h and 70 l/h should optimally be set. It is possible but not imperative to set a higher characteristic value.

Shielding gas quantity [m$^3$ (s.t.p.)/h]/component surface area [m$^2$]=characteristic value abbreviation SB [m/h]. The characteristic value SB should be set at <6 m/h. Values of <1.5 m/h should optimally be set.

Shielding gas quantity [m$^3$ (s.t.p.)/h]/heated muffle inner surface area [m$^2$]=characteristic value abbreviation SM [m/h]. The characteristic value SM should be set at >3 m/h. Values of between 6 m/h and 9 m/h should optimally be set. It is possible but not imperative to set a higher characteristic value.

Muffle inner surface area [m$^2$]/component surface area [M$^2$]=characteristic value abbreviation MB. The factor MB should be set at <0.7. The factor should optimally be set at <0.30.

In this invention it is possible, but not imperative, to completely dispense with the use of flux.

Partial addition of flux onto or at the component is possible and has no adverse effect on regions of the component which are brazed without the use of flux. Doping of the incoming shielding gas with flux or reducing substances (solid/liquid/gaseous) can be selected as desired. The high level of shielding gas used during the brazing process greatly reduces or virtually eliminates further oxidation of the aluminum surface in the temperature range above room temperature. The oxide layer that is present is torn open during the heating. Wetting of the solder to the surfaces is possible through the oxide-free gaps/cracks/areas that are formed.

The solder wetting is improved or made possible by the use of a suitable time/temperature profile in the brazing furnace. During the heat-up phase in the brazing furnace, a minimum time of at least 3 minutes must be used in the temperature range from 400 to 615 degrees Celsius. It is optimum to set times of from 4 to 8 minutes for the temperature range from 400 to 615 degrees Celsius. The time/temperature window in the temperature range from 400 to 615 degrees Celsius is dependent on alloying elements in the base material and protective platings and in the solder. Elements which influence the time interval and/or promote solder wetting include, for example, silicon, copper, strontium, bismuth, magnesium.

During the heat-up phase in the brazing furnace, it is particularly preferable for a minimum time of at least 2 minutes to be used in the temperature range from minus 30 to minus 50 K before the solidus temperature of the solder is reached. It is optimum to use times of from two to five minutes for the temperature range of solder solidus minus 30 to minus 50 K. Times above 6 minutes are also possible but are not economically appropriate.

The advantage of a specific residence time in the temperature interval of solder solidus minus 30 to minus 50 K is diffusion phenomena of elements out of the core material into the solder plating and also the homogenization of the solder and of the base material with regard to undesirable intermetallic phases, which can have the effect of inhibiting wetting in the region close to the surface.

Furthermore, in the context of certain combinations of core and solder materials, if a residence time in the temperature range of solder solidus minus 30 to minus 50 K of at least 2 minutes is used, partial melting of the solder has been observed. This means that certain fractions of the solder become liquid even before the known solidus temperatures of the solder, for example 577 degrees Celsius for AlSi10. This greatly facilitates mechanical breaking-up of the oxide layers on the solder. The time/temperature window in the temperature range solder solidus minus 30 to minus 50 K is therefore dependent on alloying elements in the base material and protective platings as well as in the solder. Elements which influence the time interval and/or influence solder wetting include, for example, silicon, copper, strontium, bismuth, magnesium and iron.

For the brazing processes according to the invention, it is particularly preferable to use a CAB furnace system (continuous furnace or bath furnace), on or in which brazing can be carried out without the use of flux and without the use of a complex vacuum furnace system. The brazing furnace atmosphere required to achieve good-quality brazed joins should contain less than or equal to 50 ppm oxygen, particularly preferably less than 30 ppm oxygen.

FIG. 1 compiles a table of the materials and solders that can be used to achieve a similar quality of brazed joins to vacuum brazing or CAB brazing under the boundary conditions described above. The letters BM stand for base material. The letters CF corrugated fin. The letter T stands for tube. The letters SP stand for solder plating. The letters TM stand for tube material.

The materials and combinations of materials shown in the table allow the use of alloys with a profile of properties that has been improved by the addition of magnesium and/or adapted to particular requirements. The improvements with regard to strength and corrosion resistance allow either stronger and more durable components to be produced or more lightweight heat exchangers to be manufactured through a reduction in material. In the case of flux-free production, additional outlay such as fluxing and drying installations and measures for environmental and employee protection are eliminated. The flux-free manufacturing in a CAB furnace can be implemented without the complex technical facilities of a single-chamber or multi-chamber vacuum furnace.

The invention claimed is:

1. A process for the flux-free brazing of components made from aluminum or aluminum materials or aluminum alloys in a continuous brazing furnace or a batch-type brazing furnace which comprises a muffle that is flushed with shielding gas in order to create a shielding gas atmosphere, wherein during the brazing of the components the muffle is supplied with shielding gas at a rate sufficient to create a low-oxygen shielding gas atmosphere in the muffle, said low-oxygen shielding gas atmosphere having an oxygen content in a brazing region of the brazing furnace of less than about 50 ppm (parts per million).

2. The process as claimed in claim 1, wherein the shielding gas comprises at least one gas selected from the group consisting of: a noble gas from the eighth main group of the periodic system of the elements, hydrogen, nitrogen, carbon dioxide, carbon monoxide, ammonia and cracking gas products of natural gas.

3. The process as claimed in claim 1, wherein during brazing of the components the rate is sufficient that the oxygen content of the shielding gas atmosphere in an entry region of the brazing furnace is below 500 ppm (parts per million).

4. The process as claimed in claim 1 wherein during brazing of the components the rate is sufficient that the oxygen content of the shielding gas atmosphere in the brazing region of the brazing furnace is less than 40 ppm (parts per million).

5. The process as claimed in claim 1, wherein during the brazing the shielding gas atmosphere is heated to above room temperature.

6. The process as claimed in claim 1, wherein the object temperature in the brazing furnace is above 300 degrees Celsius.

7. The process as claimed in claim 1, wherein the dew point in the brazing furnace atmosphere is below minus 45 degrees Celsius.

8. The process as claimed in claim 1, wherein during the heat-up phase in the brazing furnace a minimum time of not less than three minutes is used in a temperature range from 400 to 615 degrees Celsius.

9. A process for the flux-free brazing of components made from aluminum materials, aluminum alloys or wrought alloys, in a continuous brazing furnace or a batch-type brazing furnace which comprises a muffle that is flushed with shielding gas in order to create a shielding gas atmosphere, wherein during the brazing of the components the muffle is supplied with an excess quantity of shielding gas based on one or more predetermined characteristic values, so as to create a low-oxygen shielding gas atmosphere,
wherein a characteristic value SQ, comprising a quotient formed by dividing the quantity of shielding gas by the cross section of the brazing furnace, is set to be greater than 250 meters per hour.

10. The process as claimed in claim 1, wherein a characteristic value SO, comprising a quotient formed by dividing the quantity of shielding gas by the heated volume of the brazing furnace, is set to be greater than 25 per hour.

11. The process as claimed in claim 1, wherein a characteristic value SB, comprising a quotient formed by dividing the quantity of shielding gas by the size of the component surface area, is set to be less than 6 meters per hour.

12. The process as claimed in claim 1, wherein a characteristic value SM, comprising a quotient formed by dividing the quantity of shielding gas by the size of the heated muffle inner surface area of the brazing furnace, is set to be greater than 3 meters per hour.

13. The process as claimed in claim 1, wherein a characteristic value MB, comprising a quotient formed by dividing the heated muffle inner surface area by the size of the component surface area, is set to be less than 0.7.

14. The process as claimed in claim 1 for brazing heat exchangers having flow or guide devices selected from the group consisting of tubes, disks, and corrugated fins.

15. The process as claimed in claim 14, wherein the aluminum material of the flow or guide devices contains up to 0.40 percent iron.

16. The process as claimed in claim 14, wherein the aluminum material of the flow or guide devices contains 0.7 to 2 percent manganese.

17. The process as claimed in claim 1 for brazing heat exchangers having flow or guide devices selected from the group consisting of tubes, disks, and corrugated fins, wherein the flow or guide devices are provided with a solder plating made from one or more aluminum base materials.

18. The process as claimed in claim 17, wherein the aluminum base material of the solder plating contains up to 0.40 percent iron.

19. The process as claimed in claim 17, wherein, the aluminum base material of the solder plating contains 0.7 to 2 percent manganese.

20. The process as claimed in claim 1, wherein the muffle is formed from a muffle material which comprises stainless steel.

21. The process as claimed in claim 1, wherein during the heat-up phase in the brazing furnace a minimum time of at least two minutes is used in a temperature range from 30 to 50 degrees Kelvin below the solidus temperature of the solder.

22. The process as claimed in claim 1 wherein during brazing of the components the rate at which the muffle is supplied with gas is sufficient that the oxygen content of the shielding gas atmosphere in a brazing region of the brazing furnace is less than 40 ppm.

23. The process as claimed in claim 14, wherein the aluminum material of the flow or guide devices contains up to 0.25 percent iron.

24. The process as claimed in claim 14, wherein the aluminum material of the flow or guide devices contains up to 0.20 percent iron.

25. The process as claimed in claim 14, wherein the aluminum material of the flow or guide devices contains 1 to 1.5 percent manganese.

26. The process as claimed in claim 17, wherein the aluminum base material of the solder plating contains up to 0.25 percent iron.

27. The process as claimed in claim 17, wherein the aluminum base material of the solder plating contains up to 0.20 percent iron.

28. The process as claimed in claim 17, wherein the aluminum base material of the solder plating contains 1 to 1.5 percent manganese.

29. A process for the flux-free brazing of components made from aluminum or aluminum materials or aluminum alloys in a continuous brazing furnace or a batch-type brazing furnace having a muffle, the method comprising:
positioning an object to be brazed in the muffle; and
flushing a shielding gas through the muffle at a rate sufficient to produce a shielding gas atmosphere in the muffle having an oxygen content less than 50 ppm.

30. The process as claimed in claim 29, wherein flushing a shielding gas through the muffle comprises flushing a shielding gas through the muffle at a rate sufficient to produce a shielding gas atmosphere in an entry region of the brazing furnace of less than 50 ppm.

31. The process as claimed in claim 29, wherein a characteristic value SQ, comprising a quotient formed by dividing the quantity of shielding gas by the cross section of the brazing furnace is set to be greater than 250 meters per hour.

32. The process as claimed in claim 1, wherein a characteristic value SQ, comprising a quotient formed by dividing the quantity of shielding gas by the cross section of the brazing furnace, is set to be greater than 250 meters per hour.

33. The process as claimed in claim 1 wherein the brazing furnace is a continuous brazing furnace.

* * * * *